(12) United States Patent
Dadson et al.

(10) Patent No.: US 8,764,295 B2
(45) Date of Patent: Jul. 1, 2014

(54) BEARING ELEMENTS, BEARING ASSEMBLIES AND RELATED METHODS

(75) Inventors: Andrew E. Dadson, Provo, UT (US); Timothy N. Sexton, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 148 days.

(21) Appl. No.: 13/294,048

(22) Filed: Nov. 10, 2011

(65) Prior Publication Data
US 2012/0057814 A1 Mar. 8, 2012

Related U.S. Application Data

(63) Continuation-in-part of application No. 11/465,010, filed on Aug. 16, 2006, now Pat. No. 8,210,747.

(51) Int. Cl.
*F16C 33/26* (2006.01)
*F16C 17/04* (2006.01)
*F16C 33/00* (2006.01)

(52) U.S. Cl.
USPC ............................................ 384/95; 384/282

(58) Field of Classification Search
CPC .......... E21B 4/003; F16C 17/02; F16C 17/04; F16C 33/043; F16C 33/26; F16C 33/101; F16C 2352/00
USPC .............. 384/91, 92, 95, 125, 145, 282, 284, 384/285, 306–308, 420; 175/92, 325.3, 175/325.4, 359, 367, 371
See application file for complete search history.

(56) References Cited

U.S. PATENT DOCUMENTS

| | | | |
|---|---|---|---|
| 3,132,908 | A | 5/1964 | Grotzinger |
| 3,311,431 | A | 3/1967 | Hilliard |
| 3,371,970 | A | 3/1968 | Beerli |
| 3,542,441 | A | 11/1970 | Nixon |
| 3,625,327 | A | 12/1971 | Birdsey |
| 3,745,623 | A | 7/1973 | Wentorf, Jr. et al. |
| 3,858,668 | A | 1/1975 | Bell |

(Continued)

FOREIGN PATENT DOCUMENTS

| | | |
|---|---|---|
| DE | 4226986 A1 | 2/1994 |
| EP | 0543461 A2 | 5/1993 |
| WO | 8001939 | 9/1980 |

OTHER PUBLICATIONS

Restriction Requirement received in U.S. Appl. No. 11/212,232; Apr. 13, 2007.

(Continued)

*Primary Examiner* — Alan B Waits
(74) *Attorney, Agent, or Firm* — Holland & Hart LLP (57) ABSTRACT

Bearing elements, assemblies and apparatuses are provided as well as a method of manufacturing such components. In one embodiment, a bearing element comprises a superhard table forming a convex bearing surface and a radiused edge formed on the superhard table adjacent to the convex bearing surface. In another embodiment, a bearing element comprises a superhard table forming a concave bearing surface and a radiused edge formed on the superhard table adjacent to the concave bearing surface. In one embodiment, a bearing apparatus includes an inner bearing race assembly and an outer bearing race assembly. Each of the bearing race assemblies include a plurality of bearing elements. At least one of the inner and outer bearing race assemblies include a bearing element having an arcuate bearing surface and a radiused edge formed adjacent the arcuate bearing surface.

34 Claims, 7 Drawing Sheets

(56) References Cited

U.S. PATENT DOCUMENTS

| | | |
|---|---|---|
| 3,858,669 A | 1/1975 | Jeter |
| 4,129,343 A | 12/1978 | Janssen |
| 4,226,485 A | 10/1980 | Pruvot |
| 4,240,683 A | 12/1980 | Crase |
| 4,256,190 A | 3/1981 | Bodine |
| 4,268,094 A | 5/1981 | Greene |
| 4,345,798 A | 8/1982 | Cortes |
| 4,386,666 A | 6/1983 | Crase et al. |
| 4,410,054 A | 10/1983 | Nagel et al. |
| 4,468,138 A | 8/1984 | Nagel |
| 4,506,998 A | 3/1985 | Showalter |
| 4,515,486 A | 5/1985 | Ide |
| 4,560,014 A | 12/1985 | Geczy |
| 4,604,106 A | 8/1986 | Hall |
| 4,620,601 A | 11/1986 | Nagel |
| 4,629,373 A | 12/1986 | Hall |
| 4,639,146 A | 1/1987 | Yoshioka et al. |
| 4,657,090 A | 4/1987 | Geczy |
| 4,662,348 A | 5/1987 | Hall et al. |
| 4,708,496 A | 11/1987 | McPherson |
| 4,710,036 A | 12/1987 | Geczy |
| 4,720,199 A | 1/1988 | Geczy et al. |
| 4,729,440 A | 3/1988 | Hall |
| 4,732,364 A | 3/1988 | Seger et al. |
| 4,738,322 A | 4/1988 | Hall et al. |
| 4,756,631 A | 7/1988 | Jones |
| 4,764,036 A | 8/1988 | McPherson |
| 4,802,539 A | 2/1989 | Hall et al. |
| 4,818,124 A | 4/1989 | Brandenstein et al. |
| 4,997,292 A | 3/1991 | Klimkovsky et al. |
| 5,092,687 A | 3/1992 | Hall |
| 5,125,754 A | 6/1992 | Ide |
| 5,253,939 A | 10/1993 | Hall |
| 5,364,192 A | 11/1994 | Damm et al. |
| 5,368,398 A | 11/1994 | Damm et al. |
| 5,441,347 A | 8/1995 | Ide |
| 5,480,233 A | 1/1996 | Cunningham |
| 5,498,081 A | 3/1996 | Dennis et al. |
| 5,735,668 A | 4/1998 | Klein |
| 5,743,654 A | 4/1998 | Ide et al. |
| 5,795,077 A | 8/1998 | Gozdawa |
| 5,876,125 A | 3/1999 | Wyndorps et al. |
| 6,000,851 A | 12/1999 | Cohen et al. |
| 6,091,175 A | 7/2000 | Kinsinger |
| 6,422,754 B1 | 7/2002 | Dong et al. |
| 6,424,066 B1 | 7/2002 | Watson et al. |
| 6,488,103 B1 | 12/2002 | Dennis et al. |
| 6,517,246 B2 | 2/2003 | Blackley |
| 6,793,681 B1 | 9/2004 | Pope et al. |
| 7,060,641 B2 | 6/2006 | Qian et al. |
| 7,163,368 B2 | 1/2007 | Ide et al. |
| 7,306,059 B2 | 12/2007 | Ide |
| 7,608,333 B2 | 10/2009 | Eyre |
| 7,703,982 B2 | 4/2010 | Cooley |
| 7,726,420 B2 | 6/2010 | Shen et al. |
| 7,798,257 B2 | 9/2010 | Shen et al. |
| 7,870,913 B1 | 1/2011 | Sexton et al. |
| 7,946,768 B2 | 5/2011 | Cooley et al. |
| 8,277,124 B2 | 10/2012 | Sexton et al. |
| 2004/0241021 A1 | 12/2004 | Ide et al. |
| 2005/0247492 A1 | 11/2005 | Shen et al. |
| 2006/0278439 A1 | 12/2006 | Ide |
| 2007/0046120 A1 | 3/2007 | Cooley et al. |
| 2007/0110561 A1 | 5/2007 | Ide et al. |
| 2008/0115976 A1 | 5/2008 | Ide |
| 2011/0067929 A1* | 3/2011 | Mukhopadhyay et al. ... 175/432 |
| 2011/0174544 A1 | 7/2011 | Scott et al. |
| 2011/0174547 A1 | 7/2011 | Sexton et al. |

OTHER PUBLICATIONS

Non-Final Office Action received in U.S. Appl. No. 11/212,232; Jul. 10, 2007.

Final Office Action received in U.S. Appl. No. 11/212,232; Jan. 10, 2008.

International Search Report from PCT/US2006/033201 (Dec. 19, 2006).

Non-Final Office Action received in U.S. Appl. No. 11/212,232; Jun. 17, 2008.

Final Office Action received in U.S. Appl. No. 11/212,232; Dec. 4, 2008.

Non-Final Office Action received in U.S. Appl. No. 11/212,232; Mar. 16, 2009.

Final Office Action received in U.S. Appl. No. 11/212,232; Jul. 31, 2009.

Non-Final Office Action received in U.S. Appl. No. 11/879,867; Dec. 1, 2009.

Final Office Action received in U.S. Appl. No. 11/879,867; May 18, 2010.

* cited by examiner

BEARING ELEMENTS, BEARING ASSEMBLIES AND RELATED METHODS

CROSS-REFERENCE TO RELATED APPLICATIONS

This application is a continuation-in-part of U.S. patent application Ser. No. 11/465,010, filed 16 Aug. 2006, now U.S. Pat. No. 8,210,747, issued Jul. 3, 2012 and titled BEARING ELEMENTS, BEARING APPARATUSES INCLUDING SAME, AND RELATED METHODS, the disclosure of which is incorporated herein by reference in its entirety.

TECHNICAL FIELD

The present invention relates generally to bearing elements and bearing assemblies and, more particularly, to configurations, geometries and compositions of bearing elements which may be utilized individually or in an assembly.

BACKGROUND

As is well known, bearings enable relative movement between two or more components. A variety of different bearing types are known and utilized on a regular basis. Some types of bearings, such as so-called "thrust bearings" and certain embodiments of radial bearings, conventionally include bearing surfaces that at least partially contact and move or slide relative to one another. These bearing surfaces are prone to wear due to their interaction with one another and, as such, are formed from appropriate wear-resistant materials. For example, such bearing surfaces may include a superhard material for resisting wear during use of the bearing. In one particular example, at least one or both of the bearing surfaces may be formed of a material comprising diamond (e.g., polycrystalline diamond).

As noted above, bearings may be used in numerous applications. In one example, bearings used regularly in subterranean drilling equipment. Such equipment may include drilling motors and drill bits having multiple components that move relative to one another and may be utilized for drilling boreholes into a subterranean formation, such as for oil or gas exploration. In a conventional downhole drilling motor, the motor is suspended at the lower end of a string of drill pipe that includes a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, often referred to as drilling mud, is circulated through the pipe string and the motor to generate torque within the motor and to cause the rotary drill bit to rotate. Bearings are conventionally used to enable efficient relative rotation of the rotary bit and other components of the drill string.

Many types of bearings may be used in such a drill string assembly, including bearings that may be employed by a rotary drill bit. One particular example includes radial bearings. In one embodiment, an inner and outer race are each provided with a plurality of bearing elements. The races are positioned adjacent one another so that the bearing surfaces of the bearing elements contact one another. As may be appreciated, geometry and configuration of the bearing elements of the races may be an important factor influencing the performance and life of such bearing structures. Some examples of conventional radial bearing apparatuses are disclosed by U.S. Pat. Nos. 4,662,348, 4,729,440, 4,738,322, 4,756,631, 4,764,036, 4,802,539 and 5,364,192 the disclosures of each of which are incorporated, in their entireties, by this reference.

It is a continued desire within the industry to provide improved bearing elements and apparatuses including such elements.

BRIEF SUMMARY OF THE INVENTION

In accordance with the present invention, various embodiments of bearing elements, bearing assemblies and apparatuses, and methods of making such elements, assemblies and apparatuses are provided. In one embodiment, a bearing element comprises a superhard table forming a convex bearing surface and a radiused edge formed on the superhard table adjacent to the convex bearing surface. In another embodiment, a bearing element comprises a superhard table forming a concave bearing surface and a radiused edge formed on the superhard table adjacent to the concave bearing surface.

The superhard table having a convex or concave bearing surface may comprise polycrystalline diamond and be bonded to a substrate. In some embodiments, the convex bearing surface or the concave bearing may be substantially cylindrical.

The radiused edge may be configured such that it only partially surrounds the periphery of the convex bearing surface or the concave bearing surface. In one embodiment, the radiused edge exhibits a radius of approximately 0.002 inch to approximately 0.015 inch. The radius of the radiused edge may vary from a first location along a periphery of the convex bearing surface to a second location along the periphery of the convex bearing surface.

A chamfer may be positioned between the radiused edge and a sidewall of the bearing element in various embodiments. Such a chamfer may vary in its width as it extends about a periphery of the convex or concave bearing surface.

In accordance with one embodiment, a bearing apparatus is provided that comprises an outer bearing race assembly and an inner bearing race assembly. The outer bearing race assembly includes a body having a plurality of recesses defined therein and a plurality of bearing elements. Each bearing element includes a superhard table forming a arcuate bearing surface. Each bearing element is at least partially disposed within an associated recess of the plurality of recesses and the arcuate bearing surfaces collectively define a bearing surface for the outer bearing race assembly The inner bearing race assembly comprises a body having a plurality of recesses defined therein and a plurality of bearing elements. Each bearing element includes a superhard table forming a arcuate bearing surface. Each bearing element is at least partially disposed within an associated recess of the plurality of recesses and the arcuate bearing surfaces collectively defining a bearing surface for the outer bearing race assembly. The inner bearing race assembly and the outer bearing race assembly are positioned and configured relative to each other such that at least a portion of the bearing surface of the inner bearing race assembly engages at least a portion of the bearing surface of the outer bearing race assembly. At least one bearing element of the plurality of bearing elements of the outer bearing race assembly as well as the plurality of bearing elements of the inner bearing race assembly includes a radiused edge along at least a portion of a periphery of its arcuate bearing surface.

In accordance with another embodiment of the present invention, a method of manufacturing a bearing assembly is provided. The method includes forming a bearing race body including a plurality of recesses formed within the body and disposing a plurality of bearing elements within the plurality of recesses, each bearing element including a superhard table. An arcuate bearing surface is formed on each of the plurality of bearing elements while they are disposed within their associated recess. A radiused edge is formed on the superhard table adjacent the arcuate bearing surface of at least one of the plurality of bearing elements. In accordance with one embodiment, a radiused edge may be formed on all of the superhard tables of the bearing elements.

In one embodiment, the arcuate bearing surface of each bearing element may be formed using a wire electro discharge machining process. Similarly, the radiused edge or edges formed on the bearing elements may be formed using a wire electro-discharge machining process.

The superhard table may be formed in an ultra-high temperature, ultra-high pressure process. In one embodiment, forming the superhard table includes sintering polycrystalline diamond in the presence of a metallic catalyst material. The method may further comprise removing at least some catalytic material from the superhard table subsequent sintering.

Features or components of any of the embodiments set forth above, or set forth in the following detailed description may be combined with other features and elements of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

The present invention relates generally to bearing elements and apparatuses that may include bearing surfaces comprising superhard materials. "Superhard," as used herein, refers to any material having a hardness that is at least equal to or exceeds a hardness of tungsten carbide (e.g., without limitation, polycrystalline diamond, boron nitride, silicon carbide, and mixtures of the foregoing). For example, in one embodiment, a polycrystalline diamond compact (PDC) may be used to form a bearing surface in the bearing elements and apparatuses of the presently disclosed invention. In another embodiment, polycrystalline diamond may include nanodiamond (i.e., ultra-dispersed diamond), if desired. In yet another example, the bearing surface may include a silicon carbide and diamond composite material such as is disclosed in U.S. Pat. No. 7,060,641, the disclosure of which is incorporated herein, in its entirety, by this reference. A variety of other superhard materials may be utilized in forming a superhard bearing in accordance with the presently disclosed invention as will be appreciated by those of ordinary skill in the art.

Considering the example of a PDC, a PDC is conventionally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond with diamond-to-diamond bonds. Additionally, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are some non-limiting examples of solvent catalysts that may be used in forming polycrystalline diamond.

In one configuration, during sintering, the solvent catalyst may include the substrate body (e.g., cobalt from a cobalt-cemented tungsten carbide substrate). In such a case, the solvent catalyst from the substrate becomes liquid and sweeps from the region adjacent to the diamond powder and into the diamond grains. In another embodiment, a solvent catalyst may be mixed with the diamond powder prior to sintering, either in lieu of, or in addition to, the existence of a solvent catalyst in the substrate. Thus, diamond grains become mutually bonded to form a polycrystalline diamond table upon the substrate. A conventional process for forming polycrystalline diamond structures is disclosed in U.S. Pat. No. 3,745,623 to Wentorf, Jr. et al., the disclosure of which is incorporated, in its entirety, by this reference.

The solvent catalyst may remain in the polycrystalline diamond layer within the interstitial pores between the diamond grains or may be at least partially removed, such as by leaching (i.e., exposing at least a portion of the diamond table to an acid) or by any other suitable method. Removal of the catalyst may enhance the thermal stability of the PDC material. Optionally, another material may replace the solvent catalyst that has been at least partially removed from the polycrystalline diamond.

In one embodiment, a bearing apparatus may include polycrystalline diamond (or other superhard) inserts or compacts that define a plurality of bearing surfaces that move relative to one another. Such bearing apparatuses may encompass so-called thrust bearings, radial bearings, or other bearing apparatuses including bearing surfaces that move in relation to one another. Such a bearing apparatus may include a superhard table or region which forms a bearing surface. In one embodiment, such a bearing surface may be arcuate (e.g., substantially conical, substantially cylindrical, substantially spherical, concave, convex, etc.) with a radiused edge formed along at least a portion of a periphery of the bearing surface. In one embodiment, a chamfer may also be formed such that the radiused edge is located between, and provides a transition from, the chamfer and the bearing surface.

One embodiment of the present invention includes bearing apparatuses having an inner race and an outer race wherein the inner race includes a plurality of bearing elements, each of the plurality of bearing elements include a bearing surface and the plurality of bearing elements collectively define a bearing surface of the inner race. The outer race also includes a plurality of bearing elements, each having a bearing surface, and the plurality of bearing elements likewise collectively define a bearing surface for the outer race. Such bearing elements may comprise a superhard material, such as, for example, polycrystalline diamond or other appropriate material such as previously described. According to one aspect of the present invention, one or more bearing elements (of either, or both, the inner race and the outer race) may include a radiused edge that eliminates a sharp edge or corner at a periphery of a bearing surface of a bearing element.

Referring to FIGS. 1-4, various views are shown of a bearing element 100 including a superhard table 102 (e.g., comprising polycrystalline diamond, cubic boron nitride, silicon carbide, or other superhard materials) formed upon a substrate 104. The superhard table 102 forms a bearing surface 106 that, as shown in FIGS. 1-4, may exhibit a concave geometry. In one embodiment, the bearing surface 106 may be substantially cylindrical (i.e., forming at least a portion of a substantially cylindrical surface). As will be discussed in further detail below, the bearing surface 106 may be configured for contact with complementary shaped bearing surfaces of one or more additional bearing elements.

A radius, or a radiused edge 108, may be formed adjacent to at least a portion of a periphery of bearing surface 106. While the radiused edge 108 is shown to extend only partially along the periphery of the bearing surface 106 in FIGS. 1 and 2, it is noted that in other embodiments the radiused edge 108 may be configured to completely circumscribe the bearing surface 106. The radiused edge 108 may be formed at a location between the bearing surface 106 and the lateral or side surface 110 of superhard table 102.

Figure 1:
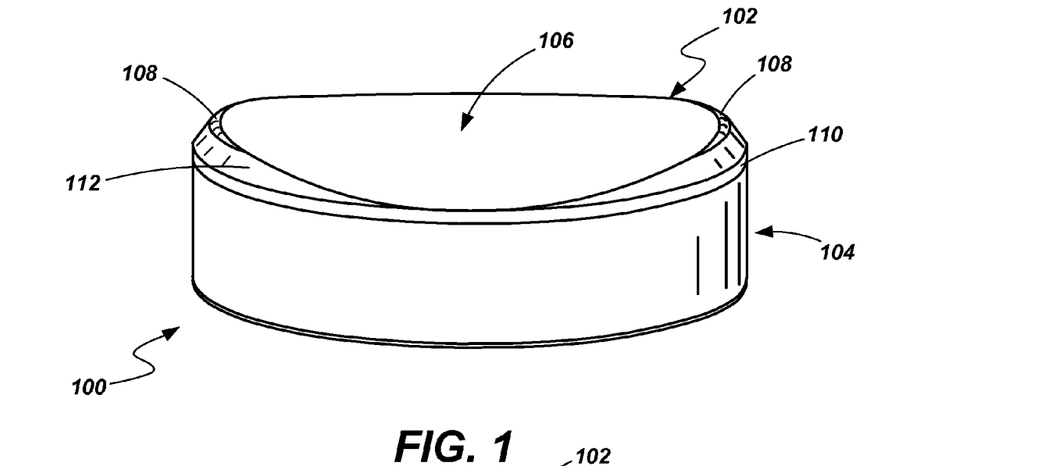
FIG. 1 shows a perspective view of an embodiment of a bearing element according to the present invention.
Figure 2:
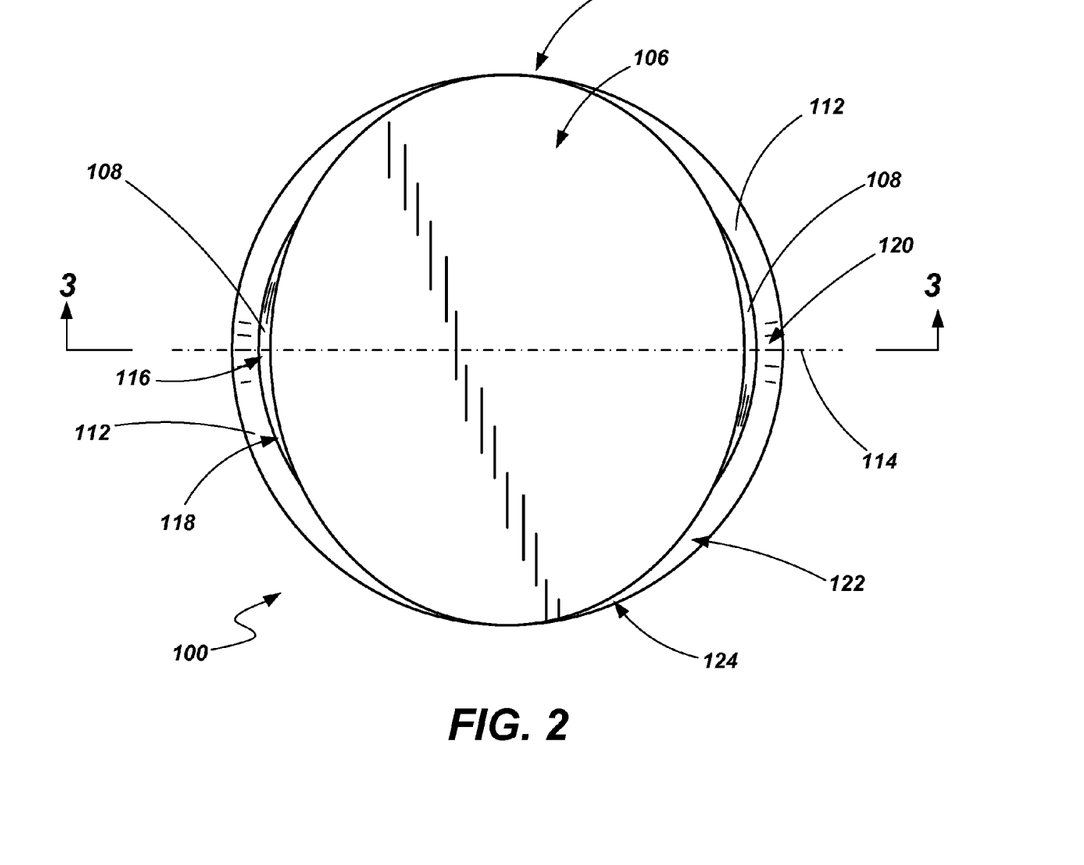
FIG. 2 shows a top elevation view of the bearing element shown in FIG. 1.

In one embodiment and as shown in FIGS. 1 and 2, the radiused edge 108 may be formed about a portion of the periphery of bearing surface 106 at a location that includes the "upper" edges of the periphery of the concave bearing surface 106. The portion of the periphery which includes the radiused edge 108 may coincide with an anticipated direction of engagement of the bearing element 102 with one or more bearing elements. For example, as indicated in FIGS. 1-4, a curved path 114 indicates the anticipated direction (or directions) of relative movement that will be experienced between the bearing element 100 and one or more additional bearing elements that will engage the bearing surface 106, such as will be described in further detail below. Such a configuration provides protection from potential impact damage with other bearing elements that engage the bearing surface 106 in a direction taken along an curved path 114.

In one embodiment, the radiused edge 108 may be disposed directly between the bearing surface 106 and the side surface 110 of the bearing element 100, providing a transition between the two surfaces. In another embodiment, as shown in FIGS. 1-4, a chamfer 112 may be formed between the radiused edge 108 and the side surface 110. The inclusion of a chamfer 112 may require a less dramatic transition by the radiused edge 108 since the radiused edge 108 will not have to extend through as great of an angular range (as compared to a transition directly from the side surface 110 to the bearing surface 106). The chamfer 112 may either completely or only partially circumscribe the bearing surface 106. Additionally, the width of the chamfer 112 may vary as it extends about the periphery of the bearing surface 106 depending on a number of factors including the size, location and radius of the bearing surface and wells as the size, location and radius of the radiused edge 108. For example, the chamfer 112 may exhibit a first width at a first location 120 as it extends from the side surface 110 to the radiused edge 108, another width at a second location 122 as it extends from the side surface 110 to the bearing surface 106, and yet another width at a third location 124 as it extends from the side surface 110 to the bearing surface 106. In one example, the chamfer 112 may be formed at an angle of approximately 45° relative to the side wall 104, and the radiused edge 108 may exhibit a radius within the range of approximately 0.002 inch and 0.015 inch.

Additionally, the radiused edge 108 may be configured to exhibit a substantially constant radius along the periphery of the bearing surface 108, or it may be configured to vary in radius as it extends along the periphery of the bearing surface 108. For example, in one embodiment, the radius may diminish from a first magnitude, exhibited at a first location 116, to another magnitude, exhibited at a second location 118. In one particular embodiment, the first location 116 may coincide with the anticipated curved path 114 of engagement between two bearing elements. In other words, the anticipated curved path 114 may cross the periphery of the bearing surface 106 at, or near, the first location 116. The magnitude of the radius exhibited by the radiused edge 108 may decrease gradually (or in some other defined manner) along the periphery between the first and second locations 116 and 118.

Figure 3:
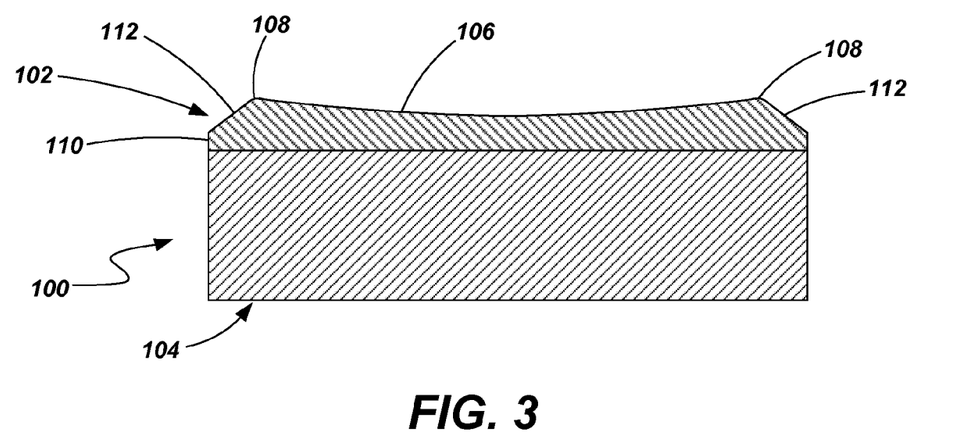
FIG. 3 shows a cross-sectional view of the bearing element shown in FIGS. 1 and 2 as taken along section lines 3-3 in FIG. 2.
Figure 4:
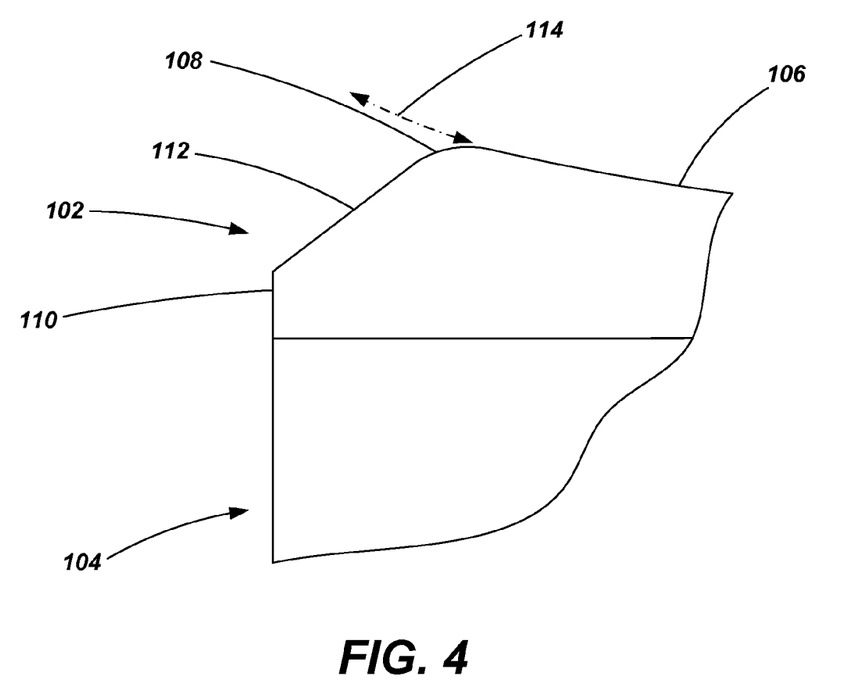
FIG. 4 is an enlarged detail view of a portion of the bearing element shown in FIGS. 1-3.

In one embodiment, a cross section of the radiused edge 108 may be configured as a substantially circular arc such that the radius is constant at a given peripheral location as seen in FIGS. 3 and 4. In another embodiment, the cross section the radiused edge 108 may be configured as a substantially elliptical arc. In a further embodiment, a cross section of the radiused edge 108 may exhibit a more complex curve at a given peripheral location such that it includes at least a first section exhibiting a first radius and a second section exhibiting a second radius, the first radius being different from the second radius in magnitude.

Referring now to FIGS. 5-8, a bearing element 130 is shown in accordance with another embodiment of the present invention. The bearing element 130 includes a superhard table 132 (e.g., comprising polycrystalline diamond, cubic boron nitride, silicon carbide, etc.) formed upon a substrate 134. In this embodiment, the superhard table 132 forms a convex bearing surface 136. In one embodiment, the convex bearing surface 136 may be substantially cylindrical (i.e., it may form or define a portion of a substantially cylindrical surface). A radiused edge 138 may be formed adjacent to at least a portion of a periphery of bearing surface 136.

Figure 5:
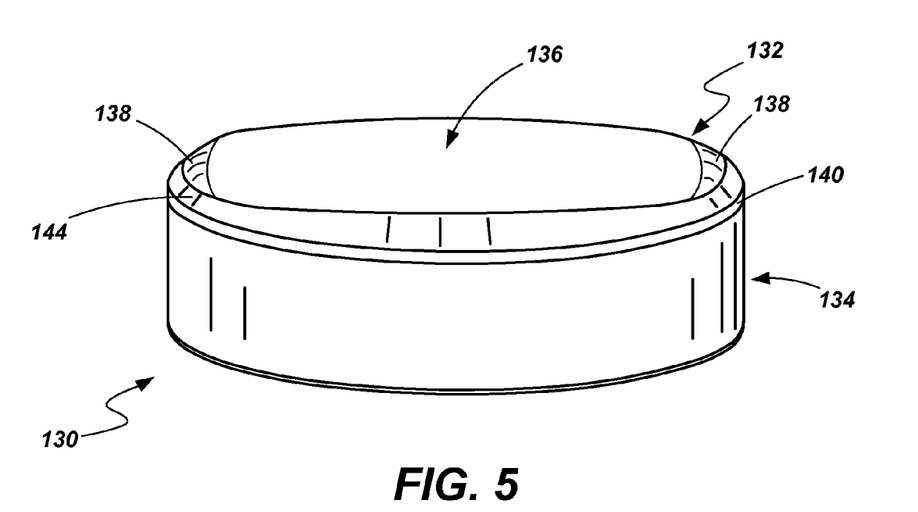
FIG. 5 shows a perspective view of another embodiment of a bearing element according to the present invention.
Figure 6:
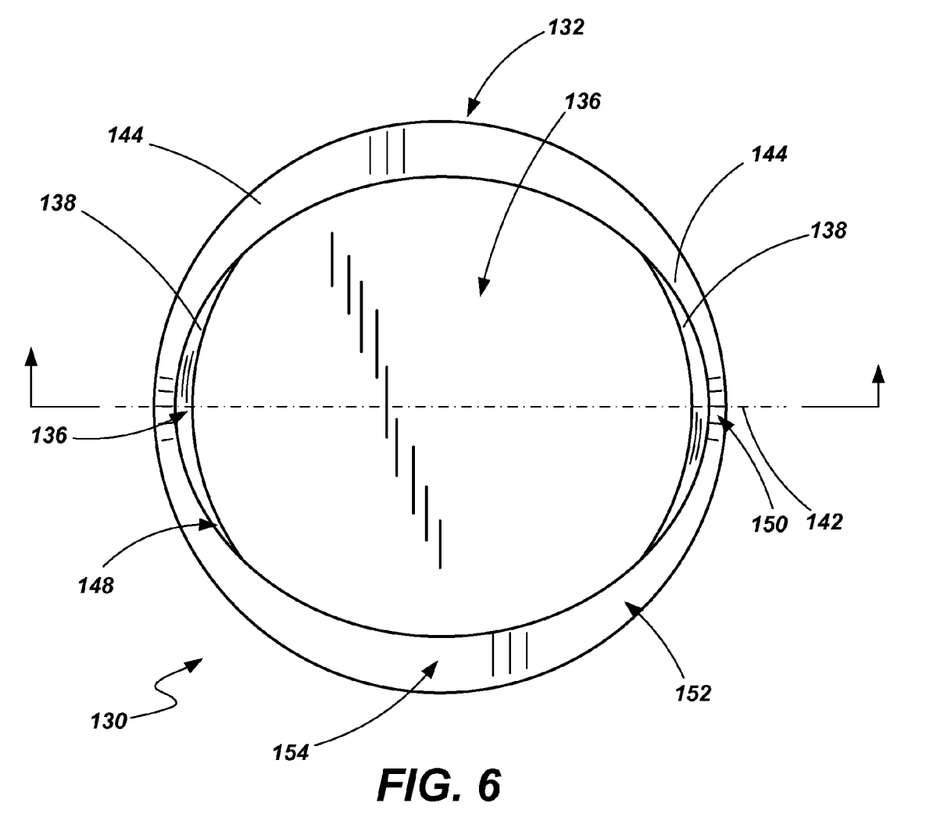
FIG. 6 shows a top elevation view of the bearing element shown in FIG. 5.

The radiused edge 138 may be formed at a location between the bearing surface 136 and the lateral or side surface 140 of superhard table 132. In one embodiment and as shown in FIGS. 5 and 6, a radiused edge 138 may be formed about at least a portion of the periphery of bearing surface 136. In such an embodiment, the portion of the periphery that includes a radiused edge 138 may coincide in location with an anticipated direction of engagement of the bearing element 130 with one or more bearing elements (e.g., bearing element 100). For example, as indicated in FIG. 6, curved path 142 indicates the anticipated direction (or directions) of engagement that will be experienced between the bearing element 100 and one or more additional bearing elements, such as will be described in further detail below.

In one embodiment, the radiused edge 138 may be disposed directly between the bearing surface 136 and the side surface 140 of the bearing element, providing a transition between the two surfaces. In another embodiment, as shown in FIGS. 5-8, a chamfer 144 may be formed between the radiused edge 138 and the side surface 140. The inclusion of a chamfer 144 may require a less dramatic transition by the radiused edge 138 since the radiused edge 138 will not have to extend through as great of an angular range (as compared to a transition directly from the side surface 140 to the bearing surface 136). The chamfer 144 may either completely or only partially circumscribe the bearing surface 136. Additionally, the width of the chamfer 144 may vary as it extends about the periphery of the bearing surface 136 depending on a number of factors including the size, location and radius of the bearing surface and wells as the size, location and radius of the radiused edge 138. For example, the chamfer 144 may exhibit a first width at a first location 150 as it extends from the side surface 140 to the radiused edge 138, another width at a second location 152 as it extends from the side surface 130 to the bearing surface 136, and yet another width at a third location 154 as it extends from the side surface 130 to the bearing surface 136. In one example, the chamfer 144 may be formed at an angle of approximately 45° relative to the side surface 140, and the radiused edge 138 may exhibit a radius within the range of approximately 0.002 inch and 0.015 inch.

Referring more specifically to FIG. 6, a top elevation view of bearing element 130 is shown (i.e., looking directly toward bearing surface 136). As seen in FIG. 6, the radiused edge 138 partially extends around the bearing surface 136. However, the location of the radiused edge 138 provides protection from potential impact damage with other bearing elements (e.g., bearing element 100) that engage the bearing surface 136 in a direction taken along an engagement axis 142. While the radiused edge 138 is shown to extend only partially along the periphery of the bearing surface 136 in FIGS. 5 and 6, it is noted that in other embodiments the radiused edge 138 may be configured to completely circumscribe the bearing surface 136.

Still referring to FIGS. 5-8, the radiused edge 138 may be configured to exhibit a substantially constant magnitude radius at all locations along the periphery of the bearing surface 136, or it may vary in magnitude as it extends along the periphery of the bearing surface 136. For example, in one embodiment, the radius may diminish from first magnitude, exhibited a first location 146, to another magnitude, exhibited at a second location 148. In one particular embodiment, the first location 146 may coincide with the anticipated engagement axis 142. In other words, the anticipated engagement axis 142 may cross the periphery of the bearing surface 136 at, or near, the first location 146. The magnitude of the radius exhibited by the radiused edge 148 may decrease gradually (or in some other defined manner) along the periphery between the first and second locations 146 and 168.

Figure 7:
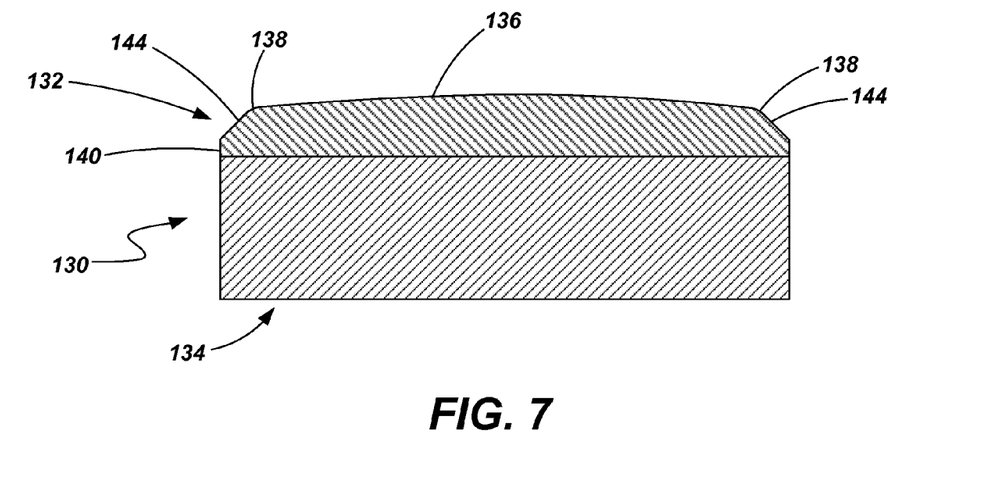
FIG. 7 shows a cross-sectional view of the bearing element shown in FIGS. 5 and 6 as taken along section lines 7-7 in FIG. 6.
Figure 8:
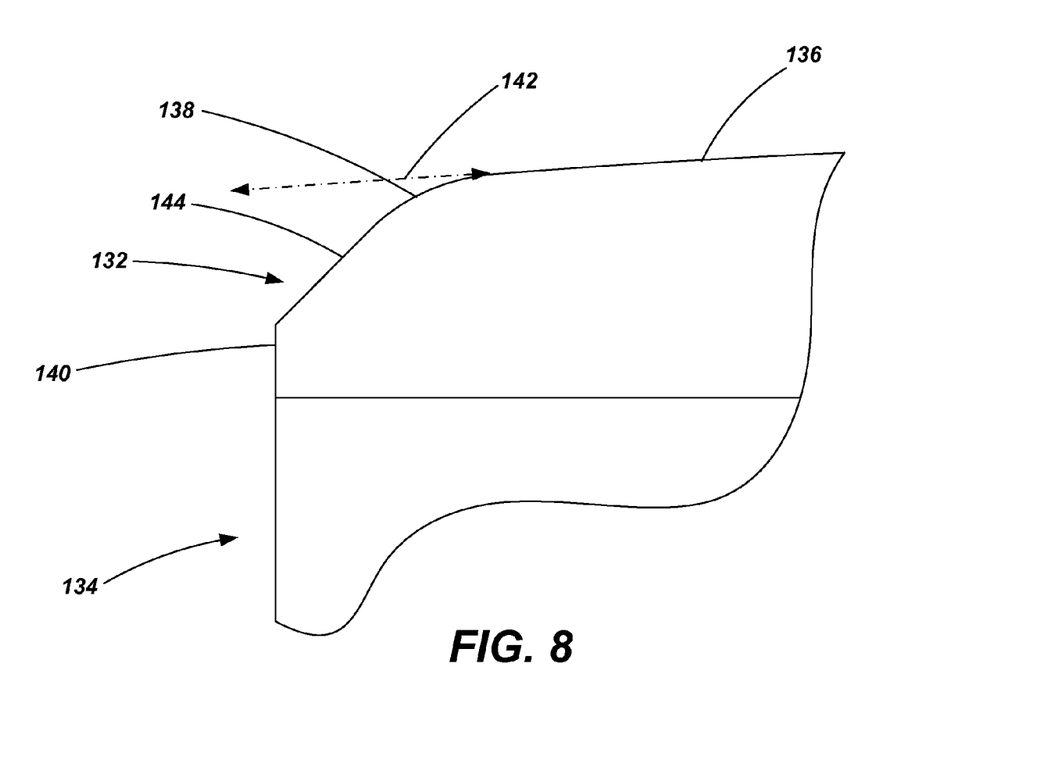
FIG. 8 is an enlarged detail view of a portion of the bearing element shown in FIGS. 5-7.

In one embodiment, a cross section of the radiused edge 138 may be configured as a substantially circular arc such that the radius is constant at a given peripheral location as seen in FIGS. 7 and 8 (showing the radiused edge 138 in cross-section). In another embodiment, a cross section of the radiused edge 138 may be substantially configured as an elliptical arc. In further embodiment, a cross section of the radiused edge 138 may exhibit a more complex curve at a given peripheral location (e.g., multiple portions exhibiting different radiuses).

As previously discussed, the superhard table (102 and 132) of the bearing elements may be formed upon substrate (104 and 134) by way of an ultra-high pressure, ultra-high temperature process to sinter the superhard material. Various features (e.g., arcuate bearing surface, radiused edge, chamfer, etc.) may be formed during the sintering process, however it may be more economical to form such features subsequent to sintering. When formed subsequent to the sintering process, features of the superhard table may be formed by a variety of techniques including grinding, by way of an electro-discharge machine (EDM), or other appropriate methods as will be appreciated by those of ordinary skill in the art. As shown in FIGS. 2 and 6, the superhard table and the substrate may be shaped exhibiting a substantially cylindrical geometry. Such a configuration may be formed, for example, by centerless grinding, EDM or any other suitable process. In other embodiments, the superhard table, the substrate, or both, may be oblong, elliptical, elongated, non-cylindrical, or otherwise shaped.

In one particular example, the bearing elements 100 and 130 may be made by high-temperature, high-pressure sintering techniques to form a substantially cylindrical structure with a superhard table (102 and 132) having a substantially flat or planar upper surface. The chamfers 112 and 144 may be formed during sintering, or subsequent to sintering, such as with a grinding process. The concave and convex bearing surfaces, 106 and 136, along with their respective radiused edges, 108 and 138, may then be formed by using a wire EDM process or a grinding process.

As discussed above, bearing elements configured in accordance with the present invention may generally include an arcuate bearing surface that is configured for contact with a complementary shaped arcuate bearing surface of another bearing element. In one example, a bearing assembly may include a first plurality of bearing elements, each including a concave bearing surface, configured to engage a second plurality of bearing elements, each including a convex bearing surface.

Figure 9:
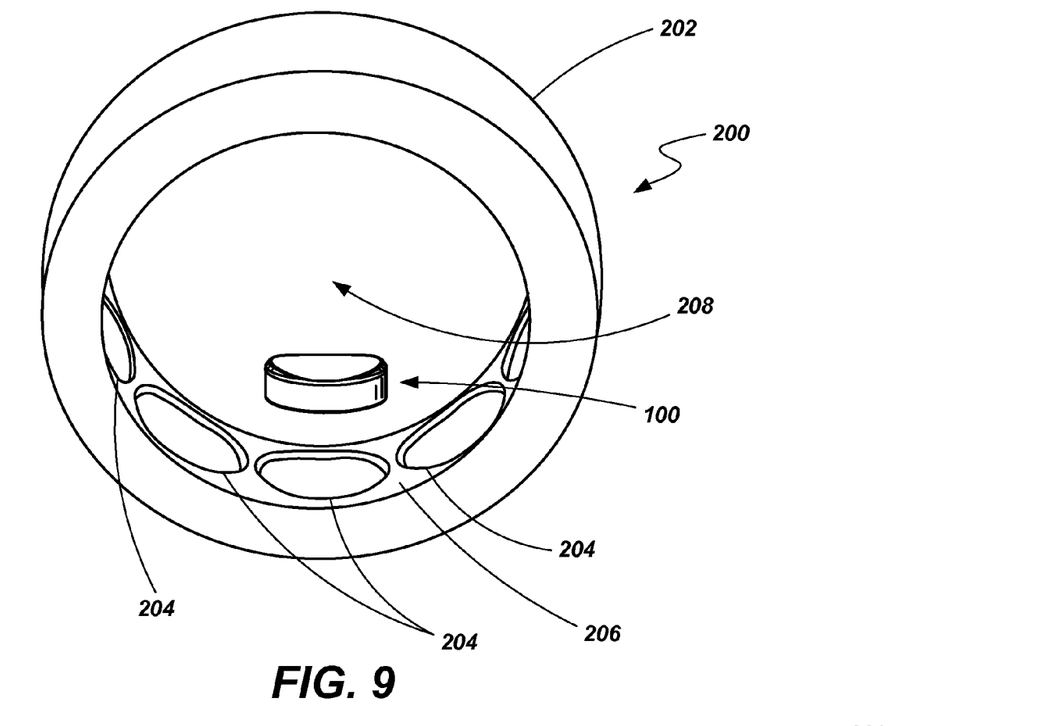
FIG. 9 shows a partial, exploded perspective view of an outer race and a bearing element to assembled with the outer race.

Referring to FIG. 9 a perspective view of an outer bearing race 200 is shown. The outer bearing race includes a body 202 that defines a plurality of recesses 204. Each recess is sized and configured to receive a bearing element (e.g., shown as bearing element 100, as described hereinabove with respect to FIGS. 1-4) positioned generally therein. While only a single bearing element 100 is shown (in exploded view) for clarity and simplicity, when the bearing race 200 is assembled, the bearing elements 100 are at least partially positioned in each recess 204. In one embodiment, the bearing elements 100 may be fixed within their associated recesses 204. For example, the bearing elements 100 may be adhesively bonded, brazed, welded, fastened, press-fit, mechanically affixed, or otherwise affixed within their associated recesses 204 by any suitable method. In another embodiment, the bearing elements 100 may be configured to float or be movable or displaced within the recesses 204 during operation of the bearing race 200. In such a case, the bearing elements 100 may be biased radially inward to ensure contact of the bearing elements with another structure. As shown in FIG. 9, body 202 of the outer race 200 may be configured in a generally ring-shaped configuration (e.g., a substantially cylindrical ring, a substantially conical ring, etc.) and may define an aperture 206 sized and configured to receive an inner race as will be described in further detail below.

In accordance with one embodiment, the bearing elements 100 may be positioned within their respective recesses 204 prior to shaping or forming of their arcuate bearing surfaces 106, radiused edges 108 and/or other features. For example, the bearing elements 100 may be to affixed within each of the recesses 204 (either temporarily or permanently) while still having a substantially planar superabrasive surface (such as may be formed during an ultra-high temperature and ultra-high pressure process). The chamfers 112 may be formed (e.g., by grinding) prior to the bearing elements being placed within the recesses. The arcuate bearing surfaces 106 may then be formed upon each superhard table 102 of each bearing element 100 while they are disposed within their respective recesses 204. In one particular embodiment, this may be done with a wire EDM process (or a grinding process) to form the arcuate bearing surfaces 106 at a desired radius by tracing or following a desired path within the outer race with a wire of an electro discharge machine. The radiused edges 108 of the bearing elements 100 may be formed at the same time, such as with a wire EDM process or a grinding process, as the arcuate bearing surfaces 106. Other desired features may also be formed in a similar manner.

It is noted that forming the arcuate bearing surfaces 106, radiused edges 108 and other features while the bearing elements 100 are positioned within the outer race 200 may provide improved tolerances and improve efficiency from a manufacturing standpoint.

Of course, it is also contemplated that the arcuate bearing surfaces, radiused edges and other features may be formed on one or more of the bearing elements prior to their coupling with the body 202 of outer race 200. Such a configuration may provide certain advantages in manufacturing flow and ease depending, for example, on what manufacturing processes are being used to form features such as the arcuate bearing surface or the radiused edges.

Figure 10:
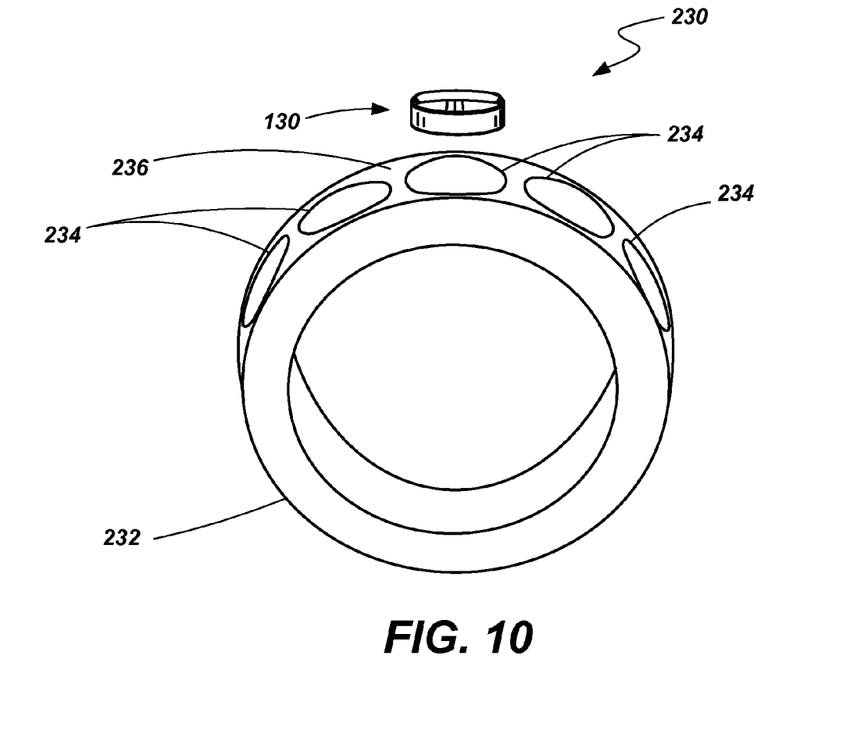
FIG. 10 shows a partial, exploded perspective view of an inner race and a bearing element to be assembled with the inner race.

Referring now to FIG. 10, a partial exploded assembly view of an inner bearing race 230 is shown. The inner race 230 includes a body 232 having a plurality of recesses 234 formed in an outer radial surface 236 thereof. Each recess 234 is sized and configured to receive a bearing element (e.g., shown as bearing element 130, as described hereinabove with respect to FIGS. 5-8) positioned generally therein. While only a single bearing element 130 is shown for clarity and simplicity, when the bearing race 230 is assembled, the bearing elements 130 are at least partially positioned in each recess 234. In one embodiment, the bearing elements 130 may be fixed within their associated recesses 234. For example, as set forth above with respect to the outer bearing race 200, the bearing elements 130 may be adhesively bonded, brazed, welded, fastened, press-fit, mechanically affixed, or otherwise affixed within their associated recesses 234 by any suitable method. In another embodiment, the bearing elements 130 may be configured to float or be displaced within the recesses 234 during operation of the bearing race 230. In such a case, the bearing elements 130 may be biased radially outward to ensure contact of the bearing surface with another structure. As shown in FIG. 10, the body 232 of the inner race 230 may be configured in a generally ring-shaped configuration (e.g., a substantially cylindrical ring, a substantially conical ring, etc.) and may be sized and configured to be positioned within an aperture or opening of an outer bearing race.

In accordance with one embodiment, the bearing elements 130 may be positioned within their respective recesses 234 prior to shaping or forming of their arcuate bearing surfaces 136, radiused edges 138 and/or other features similar to what has been described above with respect to the outer bearing race 200 and associated bearing elements 100. For example, the bearing elements 130 may be to affixed within each of the recesses 234 (either temporarily or permanently) while still having a substantially planar superabrasive surface (such as may be formed during an ultra-high temperature and ultra-high pressure process). The chamfers 144 may be formed (e.g., by grinding) prior to the bearing elements being placed within the recesses. The arcuate bearing surfaces 136 may then be formed upon the superhard tables 132 of each bearing element 130 while they are disposed within their respective recesses 204. In one particular embodiment, this may be done with a wire EDM process (or grinding process) to form the arcuate bearing surfaces 136 at a desired radius by tracing or following a desired path about the outer radial surface 236 of the inner bearing race 230 with a wire of an electro discharge machine. The radiused edges 138 of the bearing elements 130 may be formed at the same time, such as with a wire EDM process or grinding process, as the arcuate bearing surfaces 136. Other desired features may also be formed in a similar manner.

It is again noted that forming the arcuate bearing surfaces 136, radiused edges 138 and other features while the bearing elements 130 are positioned within the outer race 200 may provide improved tolerances and improve efficiency from a manufacturing standpoint. Of course, it is also contemplated that the arcuate bearing surfaces, radiused edges and other features may be formed on one or more of the bearing elements prior to their coupling with the body 232 of inner race 230. Such a configuration may provide certain advantages in manufacturing flow and ease depending, for example, on what manufacturing processes are being used to form features such as the arcuate bearing surface or the radiused edges.

Figure 11:
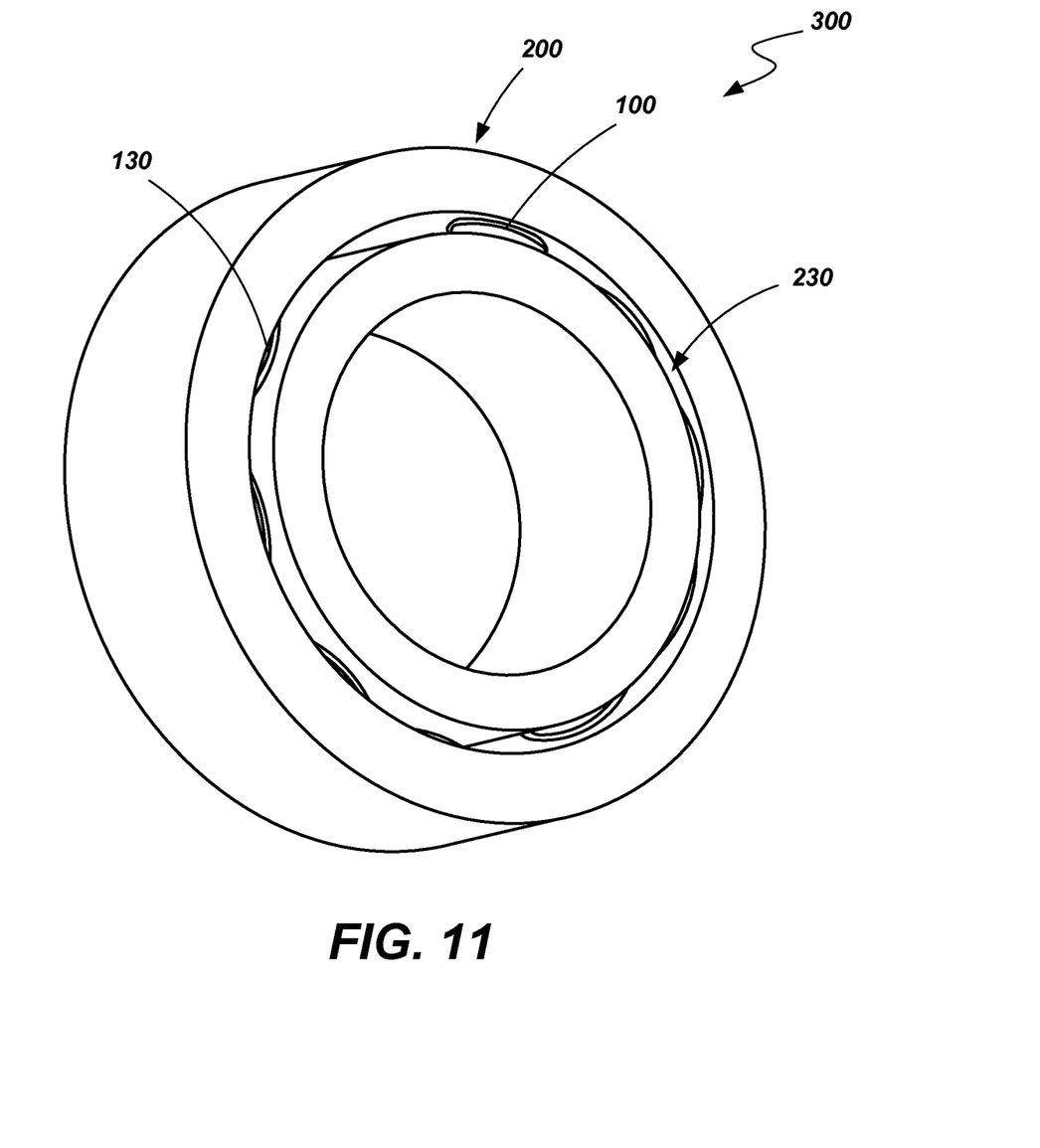
FIG. 11 shows a perspective view of a radial bearing assembly according to an embodiment of the present invention.

The present invention contemplates that the inner race may 230 be positioned within the outer race 200 and may include a bearing surface collectively defined by the individual arcuate bearing surfaces of the plurality of bearing elements (i.e., an inner race bearing surface defined by the arcuate bearing surfaces 136 of plurality of bearing elements 130 and an outer race bearing surface defined by the arcuate bearing surfaces 106 of the plurality of bearing elements 100). For example, referring to FIG. 11, a perspective view of a radial bearing apparatus 300 including inner race 230 positioned generally within outer race 200. The outer race 200 includes a plurality of bearing elements 100 disposed within associated recesses and the inner race 230 includes a plurality of bearing elements 130 disposed within associated recesses. Thus, the inner race 230 and the outer race 200 may be configured so that the bearing surfaces (collectively defined by the respective plurality of bearing elements of the inner race 230 and the respective plurality of bearing elements of the outer race 200) may at least partially contact one another while one of the bearing races rotates relative to the other bearing race.

Figure 12:
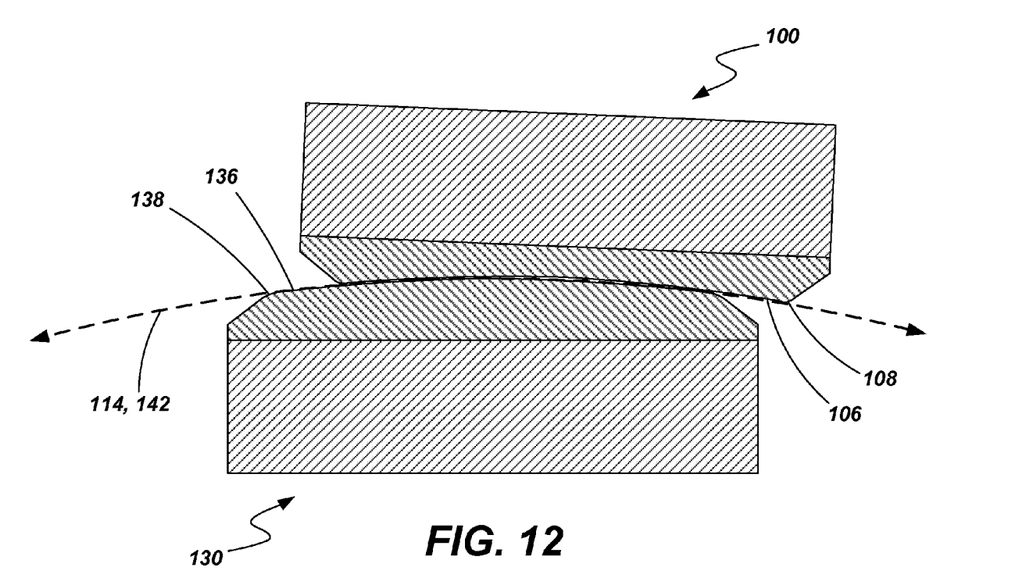
FIG. 12 shows a cross-sectional view of two bearing elements interacting as when disposed within inner and outer races of a bearing assembly.
Figure 13:
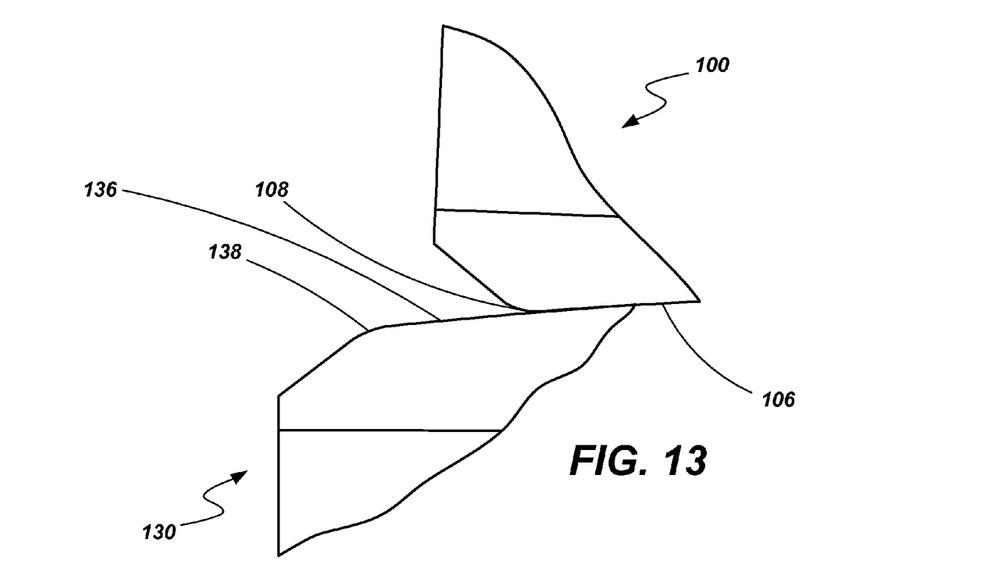
FIG. 13 shows an enlarged detail view of the bearing elements shown in FIG. 12.

As seen in FIGS. 12 and 13, as the bearing elements 100 and 130 of the bearing assembly 300 rotate relative to each other (e.g., along the curved paths 114 and 142 of their intended engagement), the arcuate bearing surface 106 of one bearing element 100 may engage and slide across the complementary arcuate bearing surface 136 of another bearing element 130. The radiused edges 108 and 138 enable the arcuate bearing surfaces 106 and 136 to engage each other during rotation of associated bearing races (200 and 230) without incurring damage to the bearing elements 100 and 130 that might otherwise occur if a sharp edge or corner were present along the periphery of the bearing surfaces 106 and 108.

While the bearing apparatus discussed above is described in terms of having a plurality of bearing elements that each include a radiused edge, the present invention is not so limited. Rather, the present invention contemplates that an inner race and an outer race may be assembled to form a bearing apparatus wherein at least one bearing element of either (or both) the inner race or the outer race includes a radiused edge formed about at least a portion of a periphery of its arcuate bearing surface.

A bearing apparatus such as described above may be included within a variety of mechanical systems. For example, so-called "roller cone" rotary drill bits may benefit from a radial bearing apparatus contemplated by the present invention. In such an instance, it will be appreciated that an inner race may be mounted or affixed to a spindle of a roller cone and an outer race may be affixed to an inner bore formed within a cone and that such an outer race and inner race may be assembled to form a radial bearing apparatus. Such a radial bearing apparatus may be advantageous because of its ability to withstand relatively high temperatures and its wear resistance. For example, the present invention contemplates that a roller cone rotary drill bit as disclosed in U.S. Pat. No. 4,738,322 to Hall, et al., (the disclosure of which is incorporated by reference herein in its entirety) may include at least one superhard bearing element or a radial bearing apparatus encompassed by the present invention. Other examples of roller cone rotary drill bits which may benefit from the presently disclosed invention are disclosed in U.S. Pat. Nos. 4,764,036, 4,410,054, and 4,560,014, the disclosures of each of which are incorporated by reference herein in their entireties.

Additionally, any other suitable rotary drill bit or drilling tool may include a radial bearing apparatus according to the present invention, without limitation. For example, a radial bearing according to the present invention may be included within a motor, pump or turbine. Generally, such a downhole drilling motor assembly may be located at the end of a series of pipe sections comprising a drill string. The housing of downhole drilling motor assembly may remain stationary as a rotary drill bit coupled thereto rotates. Thus, an output shaft of a downhole drilling motor assembly may be coupled to a rotary drill bit and drilling fluid (i.e., drilling mud) may cause torque to be applied to the output shaft to cause a rotary drill bit to rotate. Thus, such a downhole drilling motor or turbine assembly may include one or more radial bearing apparatuses. Although the apparatuses and systems described above have been discussed in the context of subterranean drilling equipment and applications, it should be understood that such apparatuses and systems are not limited to such use and could be used within a bearing apparatus or system for varied applications, if desired, without limitation. Thus, such apparatuses and systems are not limited to use with subterranean drilling systems and may be used with various other mechanical systems, without limitation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A bearing element comprising:
    a superhard table forming a convex bearing surface, the convex bearing surface comprising a portion of a cylindrical surface and including a leading edge;
    a radiused edge formed on the superhard table adjacent to the leading edge of the convex bearing surface, the radiused edge exhibiting a width between the convex bearing surface and a second surface, the width varying as the radiused edge extends from a first peripheral location an a second peripheral location.

2. The bearing element of claim 1, wherein the superhard table comprises polycrystalline diamond and is bonded to a substrate.

3. The bearing element of claim 1, wherein the superhard table further comprises a metallic catalyst material.

4. The bearing element of claim 3, wherein the metallic catalyst material is located in a first volume of the superhard table, and wherein a second volume of the superhard table is substantially devoid of any metallic catalyst material, wherein the second volume includes the convex bearing surface.

5. The bearing element of claim 1, wherein the radiused edge only partially surrounds the periphery of the convex bearing surface.

6. The bearing element of claim 1, further comprising a chamfer positioned between the radiused edge and a sidewall of the bearing element.

7. The bearing element of claim 6, wherein the chamfer varies in width as it extends about at least a portion of a periphery of the convex bearing surface.

8. The bearing element of claim 1, wherein the radiused edge exhibits a cross-sectional radius of approximately 0.002 inch to approximately 0.015 inch.

9. The bearing element of claim 1, wherein the width increases from the first peripheral location to the second peripheral location, and wherein the width decreases from the second peripheral location to a third peripheral location.

10. A bearing element comprising:
    a superhard table forming a concave bearing surface, concave bearing surface comprising a portion of a cylindrical surface and including a leading edge;
    a radiused edge formed on the superhard table adjacent to the concave bearing surface, the radiused edge exhibiting a width between the concave bearing surface and a second surface, the width varying as the radiusd edge extends from a first peripheral location and a second peripheral location.

11. The bearing element of claim 10, wherein the superhard table comprises polycrystalline diamond and is bonded to a substrate.

12. The bearing element of claim 10, wherein the superhard table further comprises a metallic catalyst material.

13. The bearing element of claim 12, wherein the metallic catalyst material is located in a first volume of the superhard table, and wherein a second volume of the superhard table is substantially devoid of any metallic catalyst material, wherein the second volume includes the concave bearing surface.

14. The bearing element of claim 10, wherein the radiused edge only partially surrounds the periphery of the concave bearing surface.

15. The bearing element of claim 10, further comprising a chamfer positioned between the radiused edge and a sidewall of the bearing element.

16. The bearing element of claim 15, wherein the chamfer varies in width as it extends about a at least a portion of a periphery of the concave bearing surface.

17. The bearing element of claim 10, wherein the radiused edge exhibits a cross-sectional radius of approximately 0.002 inch to approximately 0.015 inch.

18. The bearing element of claim 10, wherein the width increases from the first peripheral location to the second peripheral location, and wherein the width decreases from the second peripheral location to a third peripheral location.

19. A bearing apparatus comprising:
an outer bearing race assembly, the outer bearing race assembly comprising:
a body having a plurality of recesses defined therein;
a plurality of bearing elements, each bearing element including a superhard table forming an arcuate bearing surface comprising a portion of a cylindrical surface and having a leading edge, each bearing element being at least partially disposed within an associated recess of the plurality of recesses, the arcuate bearing surfaces collectively defining a bearing surface for the outer bearing race assembly;
an inner bearing race assembly, the inner bearing race assembly comprising:
a body having a plurality of recesses defined therein;
a plurality of bearing elements, each bearing element including a superhard table forming an arcuate bearing surface comprising a portion of a cylindrical surface and having a leading edge, each bearing element being at least partially disposed within an associated recess of the plurality of recesses, the arcuate bearing surfaces collectively defining a bearing surface for the outer bearing race assembly;
wherein the inner bearing race assembly and the outer bearing race assembly are located and configured such that at least a portion of the bearing surface of the inner bearing race assembly engages at least a portion of the bearing surface of the outer bearing race assembly; and
wherein, at least one bearing element of the plurality of bearing elements of the outer bearing race assembly and the plurality of bearing elements of the inner bearing race assembly includes a radiused edge along at least a portion of a periphery of its arcuate bearing surface including the leading edge, the radiused edge exhibiting a width between the arcuate bearing surface and a second surface, the width varying as the radiused edge extends from a first peripheral location and a second peripheral location.

20. The bearing apparatus of claim 19, wherein each of the plurality of bearing elements of the outer bearing race assembly include a radiused edge along at least a portion of a periphery of their respective arcuate bearing surface and wherein each of the plurality of bearing elements of the inner bearing race assembly include a radiused edge along at least a portion of a periphery of their respective arcuate bearing surface.

21. A bearing element comprising:
a superhard table forming a convex bearing surface, the convex bearing surface including a leading edge;
a transition surface formed on the superhard table adjacent to the leading edge of the convex bearing surface, the transition surface varying in width as the transition surface extends from a first peripheral location and a second peripheral location about the convex bearing surface.

22. The bearing element of claim 21, wherein the superhard table comprises polycrystalline diamond and is bonded to a substrate.

23. The bearing element of claim 21, wherein the superhard table further comprises a metallic catalyst material.

24. The bearing element of claim 23, wherein the metallic catalyst material is located in a first volume of the superhard table, and wherein a second volume of the superhard table is substantially devoid of any metallic catalyst material, wherein the second volume includes the convex bearing surface.

25. The bearing element of claim 21, wherein the transition surface only partially surrounds the periphery of the convex bearing surface.

26. The bearing element of claim 21, further comprising a chamfer positioned between the transition surface and a sidewall of the bearing element.

27. The bearing element of claim 26, wherein the chamfer varies in width as it extends about at least a portion of a periphery of the convex bearing surface.

28. A bearing element comprising:
a superhard table forming a concave bearing surface, the concave bearing surface including a leading edge;
a transition surface formed on the superhard table adjacent to the leading edge of the concave bearing surface, the transition surface varying in width as the transition surface extends from a first peripheral location and a second peripheral location about the concave bearing surface.

29. The bearing element of claim 28, wherein the superhard table comprises polycrystalline diamond and is bonded to a substrate.

30. The bearing element of claim 28, wherein the superhard table further comprises a metallic catalyst material.

31. The bearing element of claim 30, wherein the metallic catalyst material is located in a first volume of the superhard table, and wherein a second volume of the superhard table is substantially devoid of any metallic catalyst material, wherein the second volume includes the concave bearing surface.

32. The bearing element of claim 28, wherein the transition surface only partially surrounds the periphery of the concave bearing surface.

33. The bearing element of claim 28, further comprising a chamfer positioned between the transition surface and a sidewall of the bearing element.

34. The bearing element of claim 33, wherein the chamfer varies in width as it extends about at least a portion of a periphery of the concave bearing surface.

* * * * *